(12) United States Patent
Coady et al.

(10) Patent No.: US 12,204,986 B2
(45) Date of Patent: Jan. 21, 2025

(54) GENERATING QUANTUM SERVICE DEFINITIONS FROM EXECUTING QUANTUM SERVICES

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 938 days.

(21) Appl. No.: 17/243,997

(22) Filed: Apr. 29, 2021

(65) Prior Publication Data

US 2022/0351062 A1  Nov. 3, 2022

(51) Int. Cl.
*G06N 10/00* (2022.01)
*H04L 41/14* (2022.01)
*H04L 41/5054* (2022.01)

(52) U.S. Cl.
CPC .......... *G06N 10/00* (2019.01); *H04L 41/145* (2013.01); *H04L 41/5054* (2013.01)

(58) Field of Classification Search
None
See application file for complete search history.

(56) References Cited

U.S. PATENT DOCUMENTS

| | | | |
|---|---|---|---|
| 10,831,455 B2 | 11/2020 | Gambetta et al. | |
| 10,997,519 B2* | 5/2021 | Gunnels | G06F 9/5044 |
| 11,157,667 B2* | 10/2021 | Horii | G06F 30/20 |
| 11,170,137 B1* | 11/2021 | Richardson | G06F 30/20 |
| 11,308,248 B2* | 4/2022 | Matsuura | G06N 10/20 |
| 11,354,460 B2* | 6/2022 | Zuccarelli | G06N 10/00 |
| 11,586,792 B2* | 2/2023 | Horii | G06F 30/33 |
| 11,605,016 B2* | 3/2023 | Heckey | G06F 9/54 |
| 11,704,715 B2* | 7/2023 | Kasprowicz | H04L 67/10 |
| | | | 705/26.7 |
| 11,789,907 B2* | 10/2023 | Coady | G06F 16/18 |
| | | | 707/821 |
| 11,875,135 B2* | 1/2024 | Griffin | G06N 10/80 |
| 11,922,107 B2* | 3/2024 | Gutierrez | G06F 30/347 |

(Continued)

OTHER PUBLICATIONS

Fingerhuth, Mark, et al., "Open source software in quantum computing," PLoS ONE 13(12): e0208561, https://doi.org/10.1371/journal.pone.0208561, Dec. 20, 2018, 28 pages.

(Continued)

*Primary Examiner* — Hiren P Patel
(74) *Attorney, Agent, or Firm* — Dority & Manning, P.A.

(57) ABSTRACT

Generating quantum service definitions from executing quantum services is disclosed. In one example, a processor device of a quantum computing system executes a quantum service comprise one or more qubits. The processor device (e.g., by executing a quantum analysis service (QAS)) receives a request to profile the quantum service. Based on the request, the processor device obtains service metadata corresponding to the quantum service. A quantum service definition that defines one or more features of the quantum service is then generated based on the service metadata, and the quantum service definition is stored on a persistent data store. In this manner, quantum service definitions may be partially or wholly reverse-engineered for quantum services for which original quantum services definitions are unavailable or inaccessible.

20 Claims, 10 Drawing Sheets

(56) References Cited

U.S. PATENT DOCUMENTS

| | | | | |
|---|---|---|---|---|
| 11,995,485 B2* | 5/2024 | Griffin | | G06F 9/542 |
| 2018/0365585 A1* | 12/2018 | Smith | | G06N 10/00 |
| 2020/0074346 A1 | 3/2020 | Griffin et al. | | |
| 2020/0117764 A1* | 4/2020 | Zuccarelli | | G06N 10/00 |
| 2020/0125402 A1* | 4/2020 | Griffin | | G06F 15/16 |
| 2020/0201655 A1* | 6/2020 | Griffin | | G06F 9/4494 |
| 2020/0242208 A1 | 7/2020 | Daraeizadeh | | |
| 2020/0334563 A1* | 10/2020 | Gambetta | | B82Y 10/00 |
| 2021/0157662 A1* | 5/2021 | Heckey | | G06F 9/5072 |
| 2021/0182724 A1* | 6/2021 | Zou | | G06N 10/00 |
| 2023/0040849 A1* | 2/2023 | Shanmugam Sakthivadivel | | G06N 10/80 |

OTHER PUBLICATIONS

Zhang, Xin, et al., "An efficient quantum circuits optimizing scheme compared with QISKit," https://arxiv.org/pdf/1807.01703.pdf, Jul. 2018, 18 pages.

* cited by examiner

GENERATING QUANTUM SERVICE DEFINITIONS FROM EXECUTING QUANTUM SERVICES

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently obtain quantum service definitions for quantum services will be desirable.

SUMMARY

The examples disclosed herein implement a quantum analyzer service (QAS) that enables quantum service definitions to be generated based on examination of executing quantum services. In this manner, quantum service definitions may be partially or wholly reverse-engineered for quantum services for which original quantum services definitions are unavailable or inaccessible.

In one example, a method for generating quantum service definitions from executing quantum services is disclosed. The method comprises executing, by a quantum computing device, a quantum service comprising one or more qubits. The method further comprises receiving, by the quantum computing device, a request to profile the quantum service. The method also comprises obtaining, by the quantum computing device, service metadata corresponding to the quantum service based on the request. The method additionally comprises generating a quantum service definition that defines one or more features of the quantum service based on the service metadata. The method further comprises storing the quantum service definition on a persistent data store.

In another example, a quantum computing device for generating quantum service definitions from executing quantum services is disclosed. The quantum computing device comprises a system memory, and a processor device communicatively coupled to the system memory. The processor device is to execute a quantum service comprising one or more qubits. The processor device is further to receive a request to profile the quantum service. The processor device also to obtain service metadata corresponding to the quantum service based on the request. The processor device is additionally to generate a quantum service definition that defines one or more features of the quantum service based on the service metadata. The processor device is further to store the quantum service definition on a persistent data store.

In another example, a computing system for generating quantum service definitions from executing quantum services is disclosed. The computing system comprises a quantum computing device that comprises a first system memory and a first processor device communicatively coupled to the first system memory. The computing system further comprises a classical computing device that comprises a second system memory and a second processor device communicatively coupled to the second system memory. The first processor device is to execute a quantum service comprising one or more qubits. The first processor device is further to receive a request to profile the quantum service. The first processor device is also to obtain service metadata corresponding to the quantum service based on the request. The first processor device is additionally to transmit the service metadata to the classical computing device. The second processor device is to receive the service metadata. The second processor device is further to generate a quantum service definition that defines one or more features of the quantum service based on the service metadata. The second processor device is additionally to store the quantum service definition on a persistent data store.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
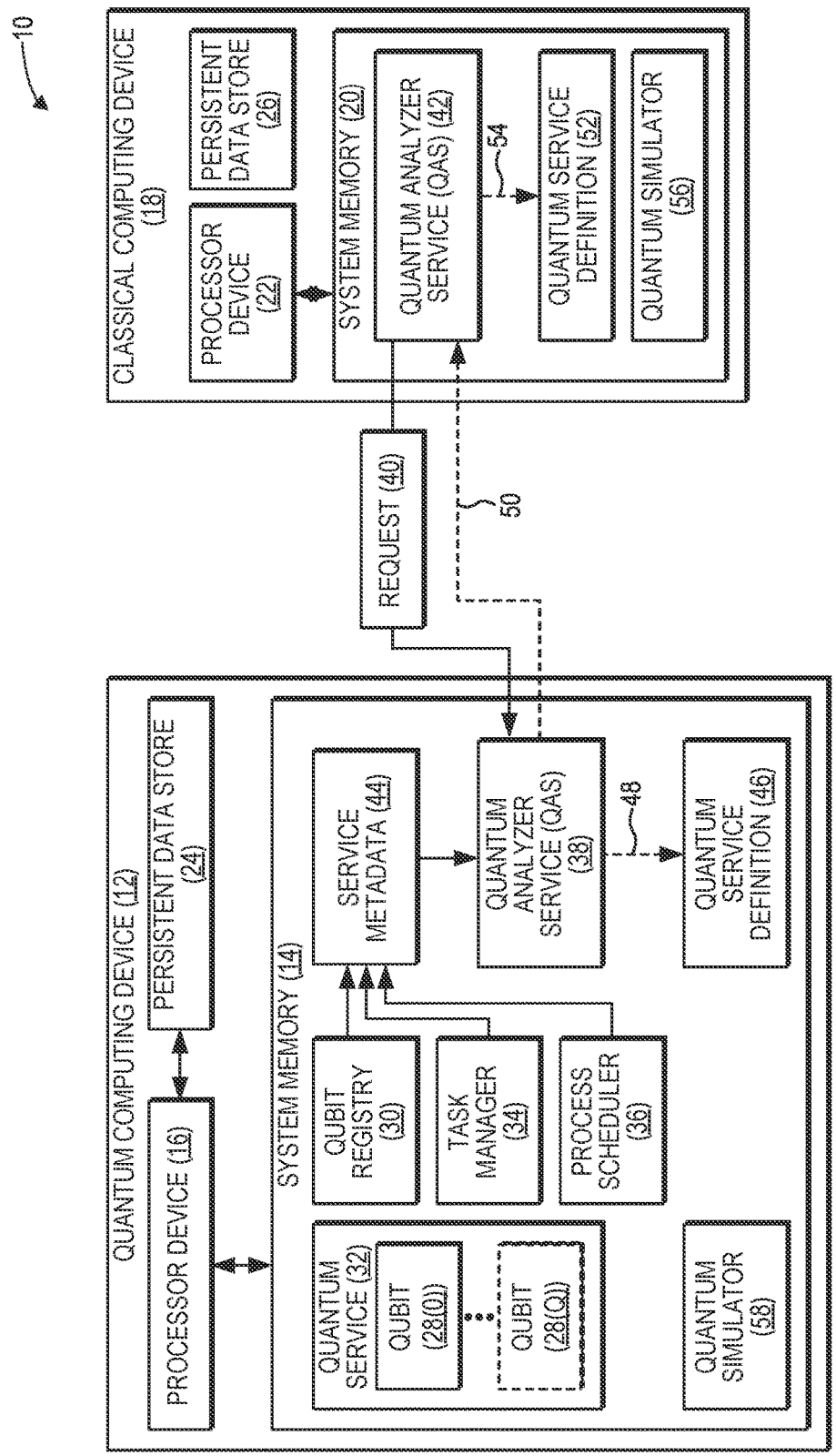
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first processor device" and "second processor device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently obtain quantum service definitions for quantum services will be desirable.

The examples disclosed herein implement a quantum analyzer service (QAS) that enables quantum service definitions to be generated based on examination of executing quantum services. As used herein, the term "quantum service" and derivatives thereof refer to a process that executes on a quantum computing device, and that accesses one or more qubits to provide a desired functionality. The term "quantum service definition" and derivatives thereof are used herein to refer to a file, such as a Quantum Assembly Language (QASM) file, that contains quantum programming instructions that define content and configuration of a quantum service.

To generate a quantum service definition for an executing quantum service, a QAS executing on a quantum computing device receives a request to profile the quantum service. The request may be received from a process or service running on the quantum computing device, a process or service running on a different quantum computing device or on a classical computing device, or a user of the quantum computing device, as non-limiting examples. The request may include, e.g., an identifier of the quantum service for which the quantum service definition is to be generated.

The QAS then obtains service metadata corresponding to the quantum service based on the request. As used herein, "service metadata" and derivatives thereof refer to data related to the quantum service that may be obtained from other services of the quantum computing device and/or from conducting performance profiling of the quantum service (e.g., by observing inputs received by and outputs generated by the quantum service and/or hardware resource usage data of the quantum service). Thus, service metadata in some examples may include data related to the number, identity, and/or location of one or more qubits used by the quantum service, inputs received by and outputs generated by the quantum service, and/or hardware resource usage data of the quantum service, as non-limiting examples.

A quantum service definition (such as a QASM file, as a non-limiting example) that defines one or more features of the quantum service is then generated based on the service metadata and stored on a persistent data store. The content of the quantum service definition is determined based on the specific service metadata obtained. For example, if the service metadata identifies a specific number of qubits used by the quantum service, a quantum service definition may be generated to include corresponding qubit allocation programming instructions. Note that the contents of the quantum service definition may be limited by the types of service metadata that can be accessed by the QAS. Thus, for example, if the quantum service employs internal logic that is not observable by the QAS, the resulting quantum service definition may not include programming instructions embodying the internal logic.

The quantum service definition may be generated and stored by the quantum computing device itself or may be generated and stored by a classical computing device based on the service metadata received from the quantum computing device. According to some examples, the quantum service definition may be subsequently used in conjunction with a quantum simulator to simulate the quantum service, FIG. 1 is a block diagram of a computing system 10 according to one example. The computing system 10 includes a quantum computing device 12 that comprises a first system memory 14 and a first processor device 16, and also includes a classical computing device 18 that comprises a second system memory 20 and a second processor device 22. The quantum computing device 12 further includes a persistent data store 24 (e.g., a hard drive, as a non-limiting example), while the classical computing device 18 includes a persistent data store 26. The quantum computing device 12 and the classical computing device 18 in FIG. 1 are communicatively coupled via a classical communications link (not shown), which may comprise a private network or a public network such as the internet. It is to be understood that the computing system 10 according to some examples may include other quantum computing devices and/or classical computing devices that are not illustrated in FIG. 1. Additionally, the quantum computing device 12 and the classical computing device 18 in some examples may include constituent elements in addition to those illustrated in FIG. 1.

The quantum computing device 12 operates in quantum environments but can operate using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In the example of FIG. 1, the quantum computing device 12 implements a set of one or more qubits 28(0)-28(Q). To maintain information for the qubit(s) 28(0)-28(Q), the quantum computing device 12 includes a qubit registry 30, which comprises a plurality of qubit registry entries (not shown) each corresponding to a qubit such as the one or more qubits 28(0)-28(Q). The qubit registry 30 in some examples maintains data relating to the qubits implemented by the quantum computing device 12, such as a count of the total number of qubits implemented by the quantum computing device 12 and a count of the number of available qubits that are currently available for allocation, as non-limiting examples. Each of the qubit registry entries of the qubit registry 30 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum process, an identifier of a quantum process associated with the corresponding qubit, and/or an entanglement indicator that indicates whether the corresponding qubit is in an entangled state.

The quantum computing device 12 of FIG. 1 executes a quantum service 32 that employs one or more of the qubit(s) 28(0)-28(Q) maintained by the quantum computing device 12. The quantum service 32 is a process that is executed by the first processor device 16 of the quantum computing device 12 to provide a desired functionality. Execution of quantum services such as the quantum service 32 is facilitated by a task manager 34 and a process scheduler 36. The task manager 34 of the quantum computing device 12 handles operations for creating, monitoring, and terminating quantum services, while the process scheduler 36 of the quantum computing device 12 controls allocation of processing resources to executing quantum services.

As discussed above, it is desirable for the quantum computing device 12 to be able to reverse engineer a quantum service definition that defines the quantum service 32 executing on the quantum computing device 12. For instance, in one possible use case, an organization making use of the quantum computing device 12 may wish to implement a quantum service that reproduces or expands upon the functionality of the quantum service 32 but may not have access to the original quantum service definition of the quantum service 32. Accordingly, the quantum computing device 12 of FIG. 1 implements a QAS 38 for generating a quantum service definition for the quantum service 32 while the quantum service 32 is executing on the quantum computing device 12.

In exemplary operation, the QAS 38 receives a request 40 (e.g., from a QAS 42 of the classical computing device 18, in the example of FIG. 1). It is to be understood that, in some examples, the request 40 may be received from a process or service executing on the quantum computing device 12 or the classical computing device 18, a process or service executing on another quantum or classical computing device, or a user of the quantum computing device 12, the classical computing device 18, or another quantum or classical computing device. The request 40 comprises an identifier (not shown) of the quantum service 32, as a non-limiting example.

Upon receiving the request 40, the QAS 38 obtains service metadata 44 corresponding to the quantum service 32 based on the request 40. The service metadata 44 may include any data related to the quantum service 32 that the QAS 38 may obtain from other services of the quantum computing device 12, such as the qubit registry 30, the task manager 34, and/or the process scheduler 36. The service metadata 44 may also include data that the QAS 38 may obtain by conducting performance profiling of the quantum service 32 (i.e., observing or monitoring the execution of the quantum service 32). Thus, the service metadata 44 in some examples may include data related to the number, identity, and/or location of the one or more qubits 28(0)-28(Q) used by the quantum service 32, configuration data for the quantum service 32, inputs received by and outputs generated by the quantum service 32, and/or hardware resource usage data of the quantum service 32, as non-limiting examples.

In some examples, the QAS 38 may then use the service metadata 44 to generate a quantum service definition 46 that defines one or more features of the quantum service 32 based on the service metadata 44, as indicated by arrow 48. The QAS 38 then stores the quantum service definition 46 on the persistent data store 24. Some examples may provide that the QAS 38 also transmits the quantum service definition 46 to the classical computing device 18.

The one or more features defined by the quantum service definition 46 may comprise, e.g., an interface that may be used to access functionality of the quantum service 32 (based on observed inputs to the quantum service 32), an output of the quantum service 32 (based on observed outputs from the quantum service 32), allocation of one or more qubits corresponding to the one or more qubits 28(0)-28(Q) used by the quantum service 32, and the like, as non-limiting examples. The quantum service definition 46 may include quantum programming instructions to, e.g., allocate one or more qubits or define relationships between qubits, as non-limiting examples. In some examples, the quantum service definition 46 may comprise a QASM file, where QASM is a programming language that specifies quantum circuits as input to a quantum computer by declaring classical bits and qubits and describing operations on the qubits and measurements needed to obtain a classical result based on the qubits.

Note that the contents of the quantum service definition 46 may be limited by the types of service metadata 44 that can be accessed by the QAS 38. Thus, for example, if the quantum service 32 employs internal logic that is not observable by the QAS 38, the resulting quantum service definition 46 may not include programming instructions embodying the internal logic.

Some examples may provide that, instead of generating the quantum service definition 46 itself, the QAS 38 may transmit the service metadata 44 to the QAS 42 of the classical computing device 18, as indicated by arrow 50. The QAS 42 of the classical computing device 18 may then use the service metadata 44 to generate a quantum service definition 52 as indicated by arrow 54 and may store the quantum service definition 52 on the persistent data store 26.

In some examples, the quantum service definitions 46, 52 may be used by the quantum computing device 12 and/or the classical computing device 18, respectively, to simulate the quantum service 32. For example, the classical computing device 18 in some examples may provide a quantum simulator 56, such as the Qiskit quantum computing framework, as a non-limiting example. The Qiskit quantum computing framework is an open-source framework that provides tools for creating and manipulating quantum programs and services and simulating execution of the quantum programs and services on classical computing devices. The classical computing device 18 may use the quantum service definition 52 to simulate the quantum service 32 using the quantum simulator 56. Similarly, the quantum computing device 12 (which may be operated using classical computing principles) may provide a quantum simulator 58 that may employ the quantum service definition 46 to simulate the quantum service 32.

It is to be understood that, because the QAS 38 is a component of the quantum computing device 12, functionality implemented by the QAS 38 may be attributed to the computing system 10 generally. Moreover, in examples where the QAS 38 comprises software instructions that program the first processor device 16 to carry out functionality discussed herein, functionality implemented by the QAS 38 may be attributed herein to the first processor device 16. It is to be further understood that while, for purposes of illustration only, the QAS 38 is depicted as a single component, the functionality implemented by the QAS 38 may be implemented in any number of components, and the examples discussed herein are not limited to any particular number of components.

Figure 2A:
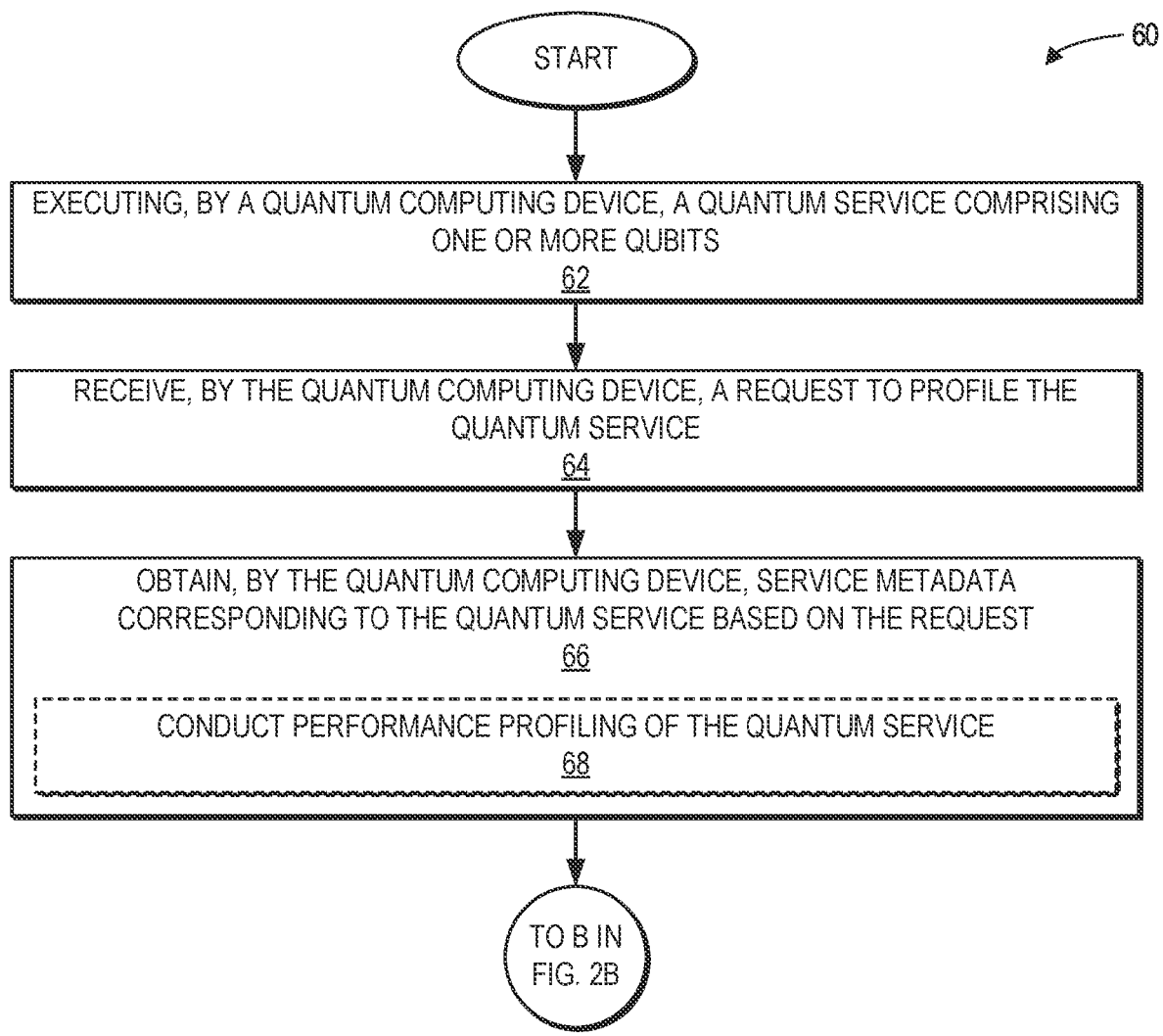
FIGS. 2A-2C are flowcharts illustrating operations performed by the computing system of FIG. 1 for generating quantum service definitions from executing quantum services, according to one example.
Figure 2B:
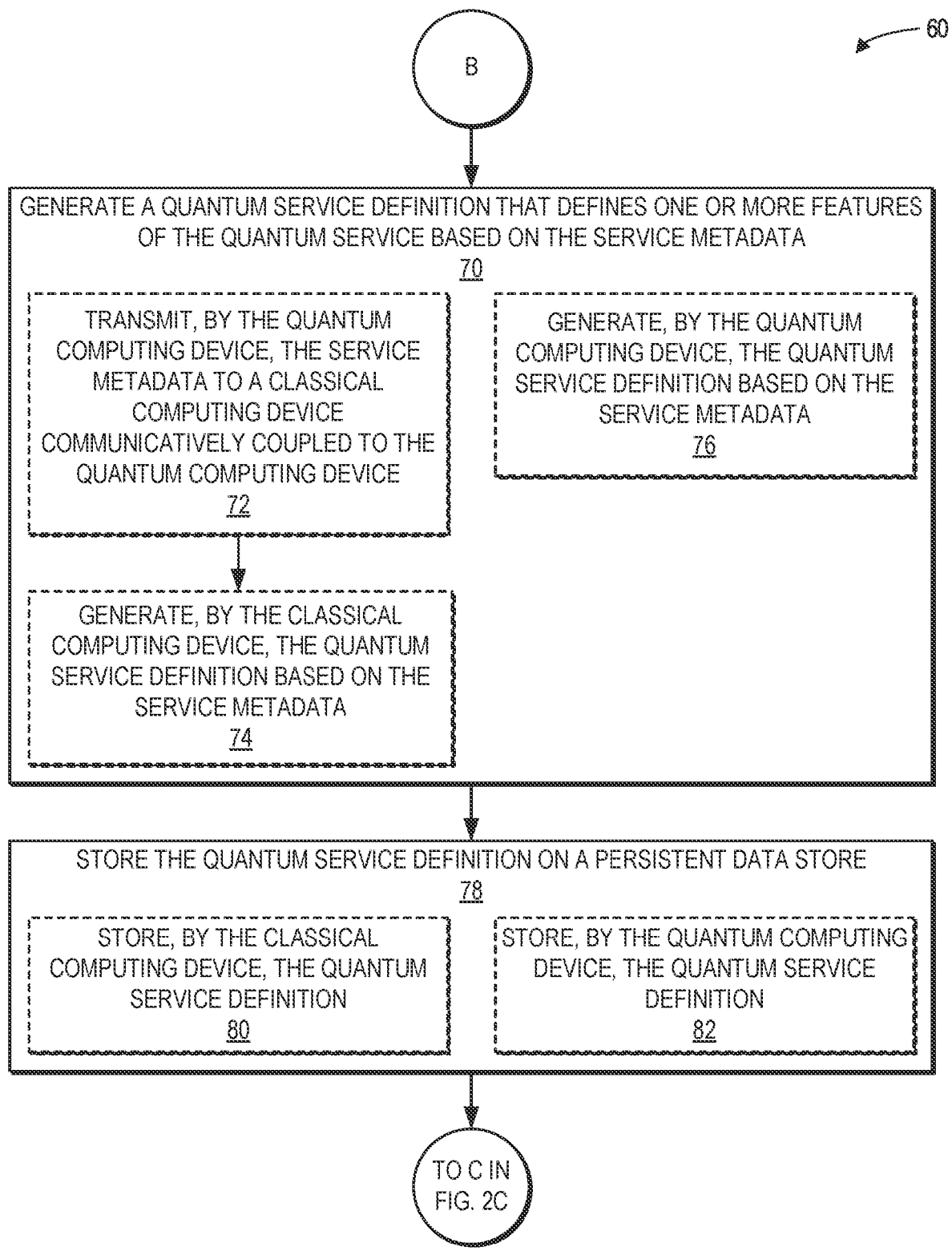
Figure 2C:
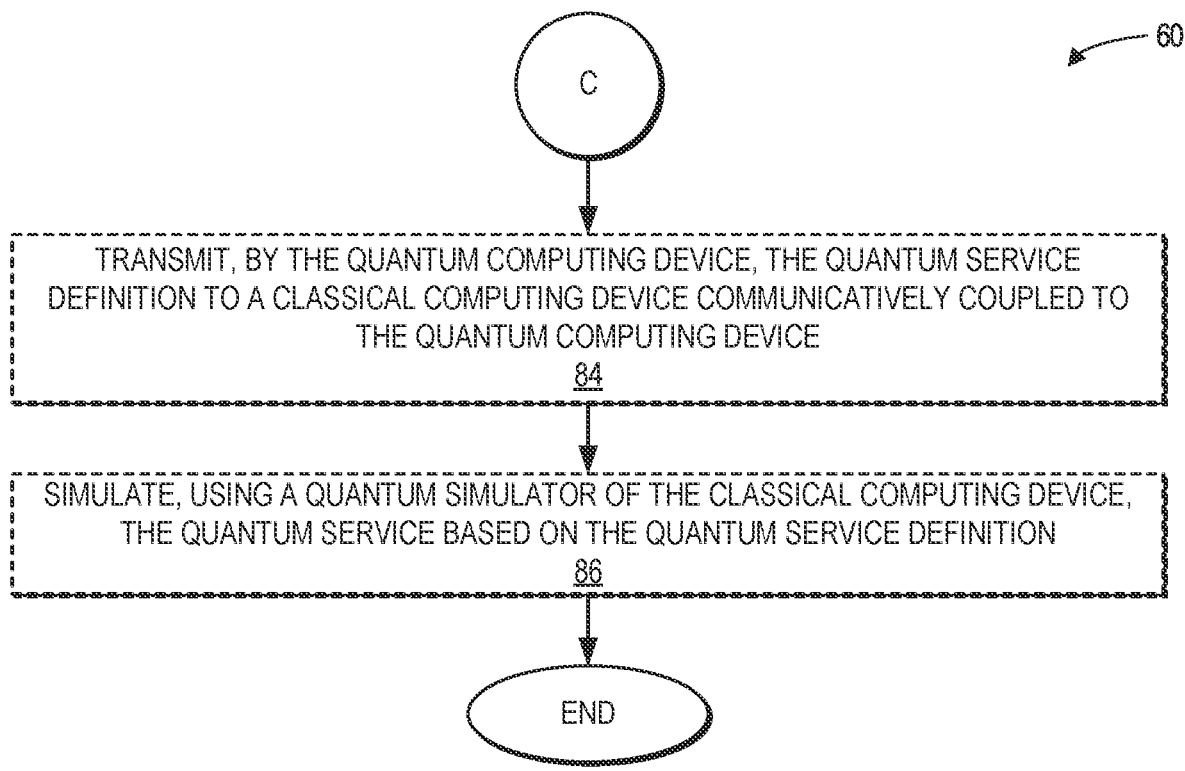

To illustrate exemplary operations performed by the computing system 10 of FIG. 1 for generating quantum service definitions from executing quantum services according to one example, FIGS. 2A-2C provide a flowchart 60. Elements of FIG. 1 are referenced in describing FIGS. 2A-2C for the sake of clarity. In FIG. 2A, operations begin with a quantum computing device, such as the quantum computing device 12 of FIG. 1, executing a quantum service (e.g., the quantum service 32 of FIG. 1) comprising one or more qubits such as the qubit(s) 28(0)-28(Q) of FIG. 1 (block 62). The quantum computing device 12 receives (e.g., using the QAS 38 of FIG. 1) the request 40 to profile the quantum service 32 (block 64). The quantum computing device 12 then obtains service metadata (e.g., the service metadata 44 of FIG. 1) corresponding to the quantum service 32 based on the request 40 (block 66). In some examples, the operations of block 66 for obtaining the service metadata 44 may comprise the quantum computing device 12 conducting performance profiling of the quantum service 32 (block 68). Operations then continue at block 70 in FIG. 2B.

Referring now to FIG. 2B, a quantum service definition (e.g., the quantum service definition 46 or the quantum service definition 52 of FIG. 1) that defines one or more features of the quantum service 32 is generated based on the service metadata 44 (block 70). In some examples, the operations of block 70 for generating the quantum service definition may comprise the quantum computing device 12 transmitting the service metadata 44 to a classical computing device (such as the classical computing device 18 of FIG. 1) that is communicatively coupled to the quantum computing device 12 (block 72). The classical computing device 18 may then generate the quantum service definition 52 based on the service metadata 44 (block 74). Some examples may provide that the operations of block 70 for generating the quantum service definition may comprise the quantum computing device 12 generating the quantum service definition 46 based on the service metadata 44 (block 76).

The quantum service definition 46 or 52 is then stored on a persistent data store, such as the persistent data store 24 or the persistent data store 26 of FIG. 1 (block 78). Thus, for instance, examples in which the quantum service definition 52 is generated by the classical computing device 18 may provide that the operations of block 78 for storing the quantum service definition comprise the classical computing device 18 storing the quantum service definition 52 on the persistent data store 26 (block 80). Similarly, examples in which the quantum service definition is generated by the quantum computing device 12 may provide that the operations of block 78 for storing the quantum service definition comprise the quantum computing device 12 storing the quantum service definition 46 on the persistent data store 24 (block 82). Operations according to some examples may then continue at block 84 of FIG. 2C.

Turning now to FIG. 2C, in examples in which the quantum service definition 46 is generated by the quantum computing device 12, the quantum computing device 12 may then transmit the quantum service definition 46 to the classical computing device 18 communicatively coupled to the quantum computing device 12 (block 84). The classical computing device 18 in some examples may then simulate, using a quantum simulator (such as the quantum simulator 56 of FIG. 1), the quantum service 32 based on the quantum service definition 46 (block 86).

Figure 3:
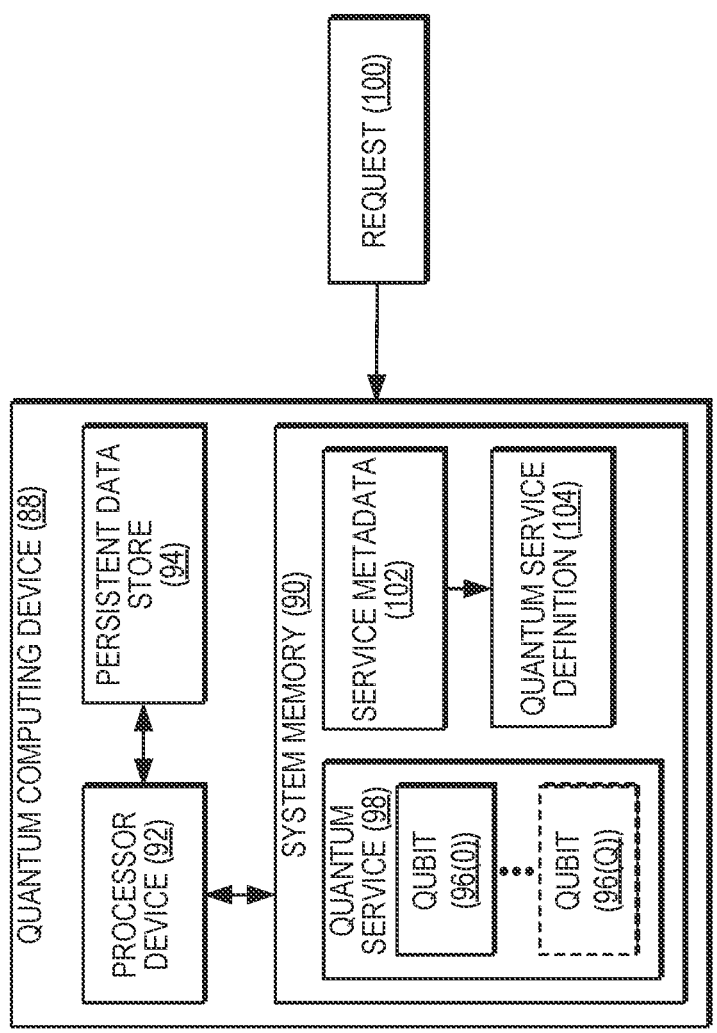
FIG. 3 is a simpler block diagram of the quantum computing device of FIG. 1 for generating and storing quantum service definitions, according to one example.

FIG. 3 is a simpler block diagram of the quantum computing device 12 of FIG. 1 for generating quantum service definitions from executing quantum services, according to one example. In the example of FIG. 3, a quantum computing device 88 comprises a system memory 90 and a processor device 92. The quantum computing device 88 further includes a persistent data store 94 (e.g., a hard drive, as a non-limiting example). The quantum computing device 88 of FIG. 3 implements a set of one or more qubits 96(0)-96(Q) and executes a quantum service 98 that employs one or more of the qubit(s) 96(0)-96(Q) maintained by the quantum computing device 88. The quantum service 98 is a process that is executed by the processor device 92 of the quantum computing device 88 to provide a desired functionality.

In exemplary operation, the processor device 92 of the quantum computing device 88 receives a request 100. Upon receiving the request 100, processor device 92 obtains service metadata 102 corresponding to the quantum service 98 based on the request 100. The processor device 92 next uses the service metadata 102 to generate a quantum service definition 104 that defines one or more features of the quantum service 98 based on the service metadata 102. The processor device 92 then stores the quantum service definition 104 on the persistent data store 94.

Figure 4:
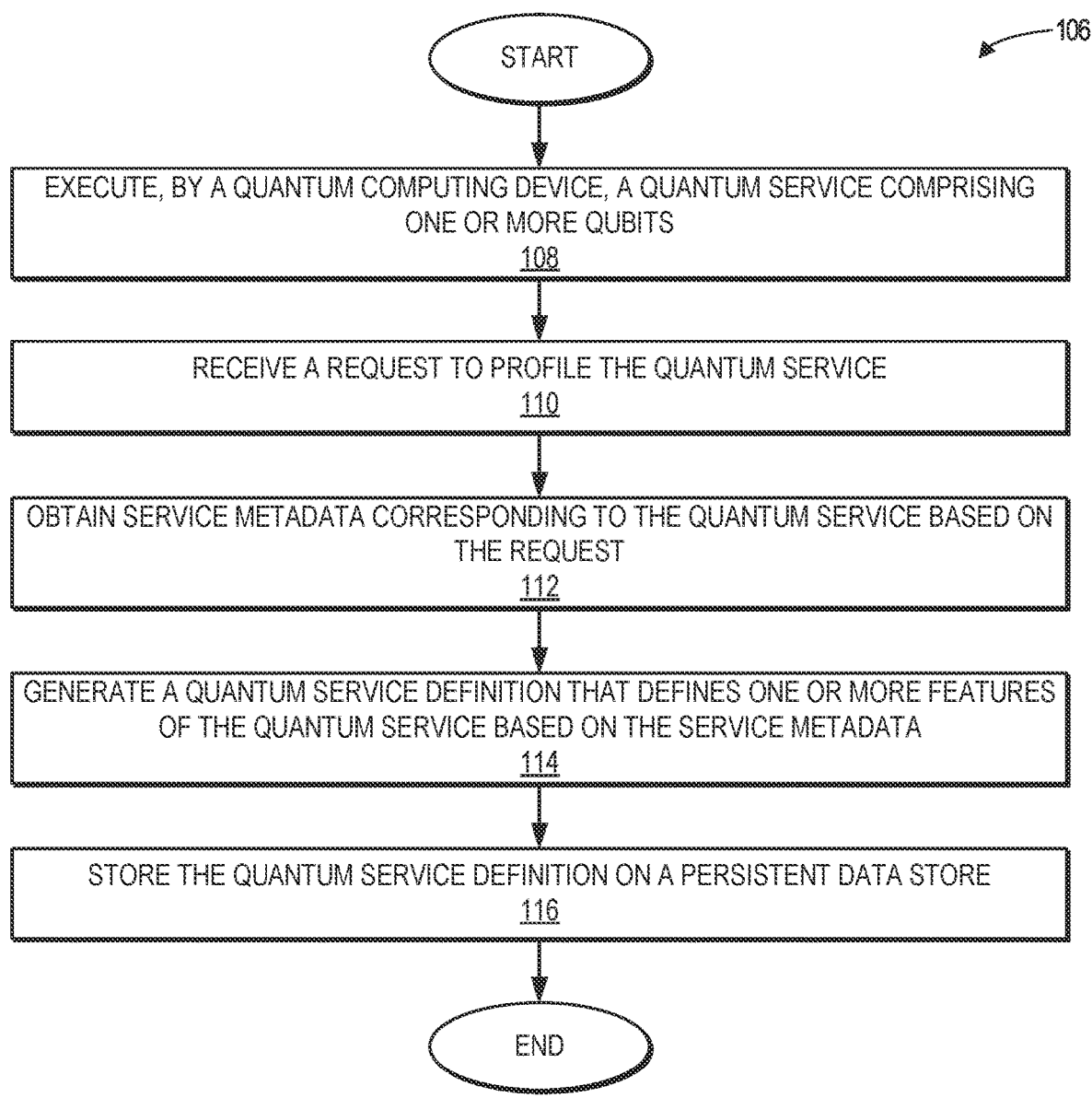
FIG. 4 is a flowchart of a simplified method for generating quantum service definitions from executing quantum services by the quantum computing device of FIG. 3, according to one example.

FIG. 4 provides a flowchart 106 of a simplified method for generating quantum service definitions from executing quantum services by the quantum computing device 88 of FIG. 3, according to one example. For the sake of clarity, elements of FIG. 3 are referenced in describing FIG. 4. Operations in FIG. 4 begin with the quantum computing device 88 executing the quantum service 98 comprising the one or more qubits 96(0)-96(Q) (block 108). The quantum computing device 88 receives the request 100 to profile the quantum service 98 (block 110). The quantum computing device 88 next obtains the service metadata 102 corresponding to the quantum service 98 based on the request 100 (block 112). The quantum computing device 88 then generates the quantum service definition 104 that defines one or more features of the quantum service 98 based on the service metadata 102 (block 114). Finally, the quantum computing device 88 stores the quantum service definition 104 on the persistent data store 94 (block 116).

Figure 5:
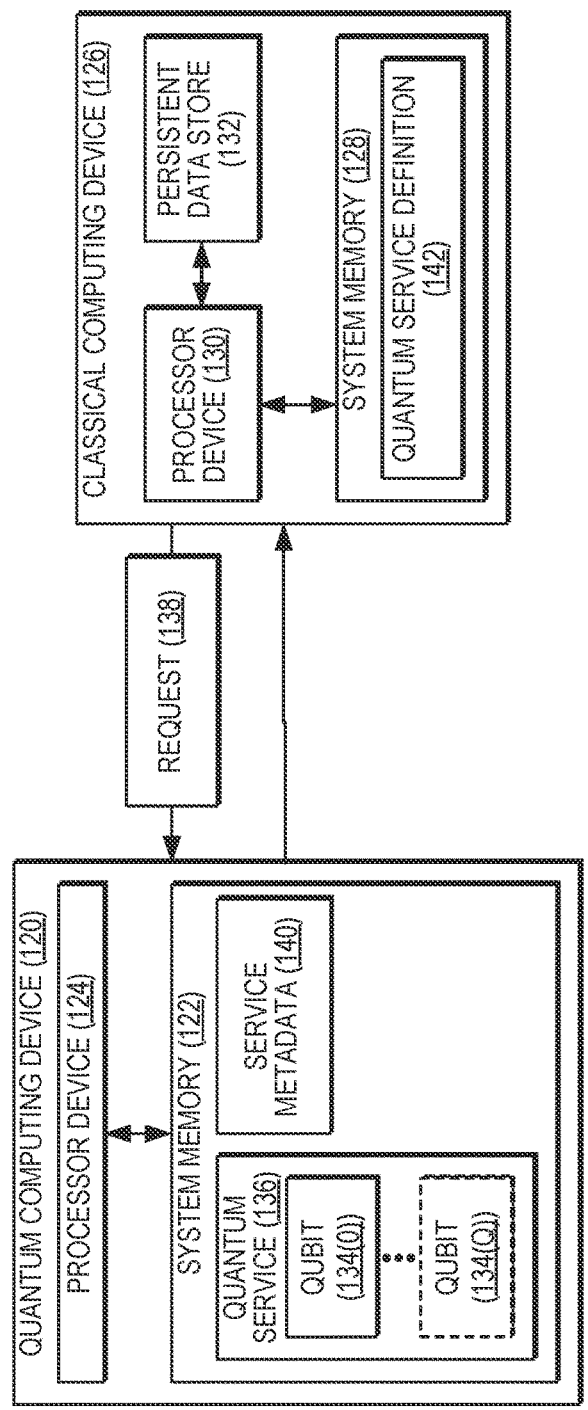
FIG. 5 is a simpler block diagram of the computing system of FIG. 1 for generating and storing quantum service definitions, according to one example.

FIG. 5 is a simpler block diagram of the computing system 10 of FIG. 1 for generating quantum service definitions from executing quantum services, according to one example. In the example of FIG. 5, a computing system 118 includes a quantum computing device 120 that comprises a first system memory 122 and a first processor device 124, and also includes a classical computing device 126 that comprises a second system memory 128 and a second processor device 130. The classical computing device 126 includes a persistent data store 132 (e.g., a hard drive, as a non-limiting example). The quantum computing device 120 of FIG. 5 implements a set of one or more qubits 134(0)-134(Q) and executes a quantum service 136 that employs one or more of the qubit(s) 134(0)-134(Q). The quantum service 136 is a process that is executed by the first processor device 124 of the quantum computing device 120 to provide a desired functionality.

In exemplary operation, the first processor device 124 of the quantum computing device 120 receives a request 138. Upon receiving the request 138, the first processor device 124 obtains service metadata 140 corresponding to the quantum service 136 based on the request 138. The first processor device 124 then transmits the service metadata 140 to the classical computing device 126. Upon receiving the service metadata 140, the second processor device 130 of the classical computing device 126 uses the service metadata 140 to generate a quantum service definition 142 and stores the quantum service definition 142 on the persistent data store 132.

Figure 6:
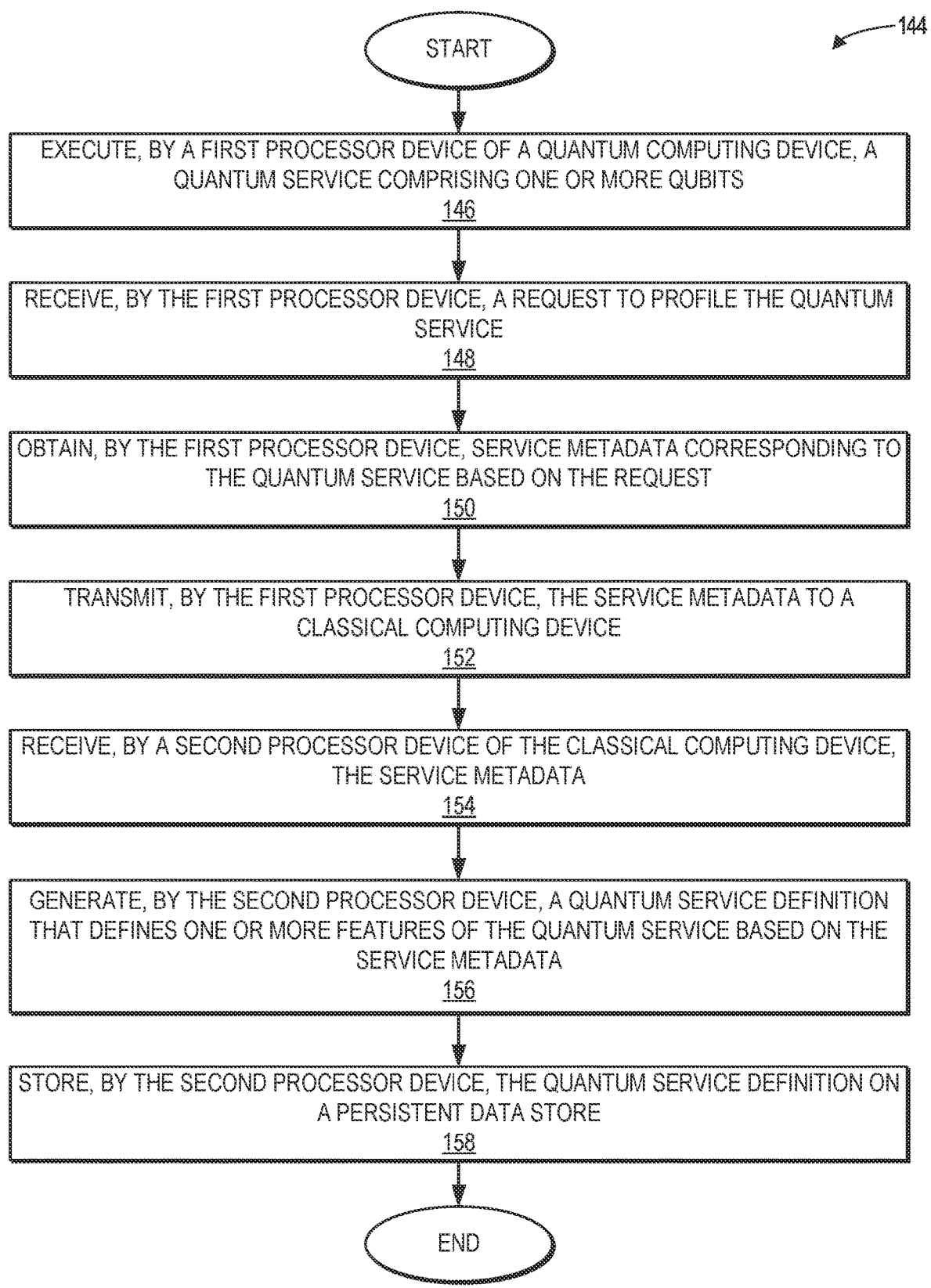
FIG. 6 is a flowchart of a simplified method for generating quantum service definitions from executing quantum services by the quantum computing system of FIG. 5, according to one example.

FIG. 6 provides a flowchart 144 of a simplified method for generating quantum service definitions from executing quantum services in the computing system 118 of FIG. 5, according to one example. Elements of FIG. 5 are referenced in describing FIG. 6 for the sake of clarity. In FIG. 6, operations begin with begin the first processor device 124 of the quantum computing device 120 executing the quantum service 136 comprising the one or more qubits 134(0)-134

(Q) (block 146). The first processor device 124 receives the request 138 to profile the quantum service 136 (block 148). The first processor device 124 next obtains the service metadata 140 corresponding to the quantum service 136 based on the request 138 (block 150). The first processor device 124 then transmits the service metadata 140 to a classical computing device 126 (block 152).

The second processor device 130 of the classical computing device 126 receives the service metadata 140 (block 154). The second processor device 130 generates the quantum service definition 142 that defines one or more features of the quantum service 136 based on the service metadata 140 (block 156). The second processor device 130 then stores the quantum service definition 142 on the persistent data store 132 (block 158).

Figure 7:
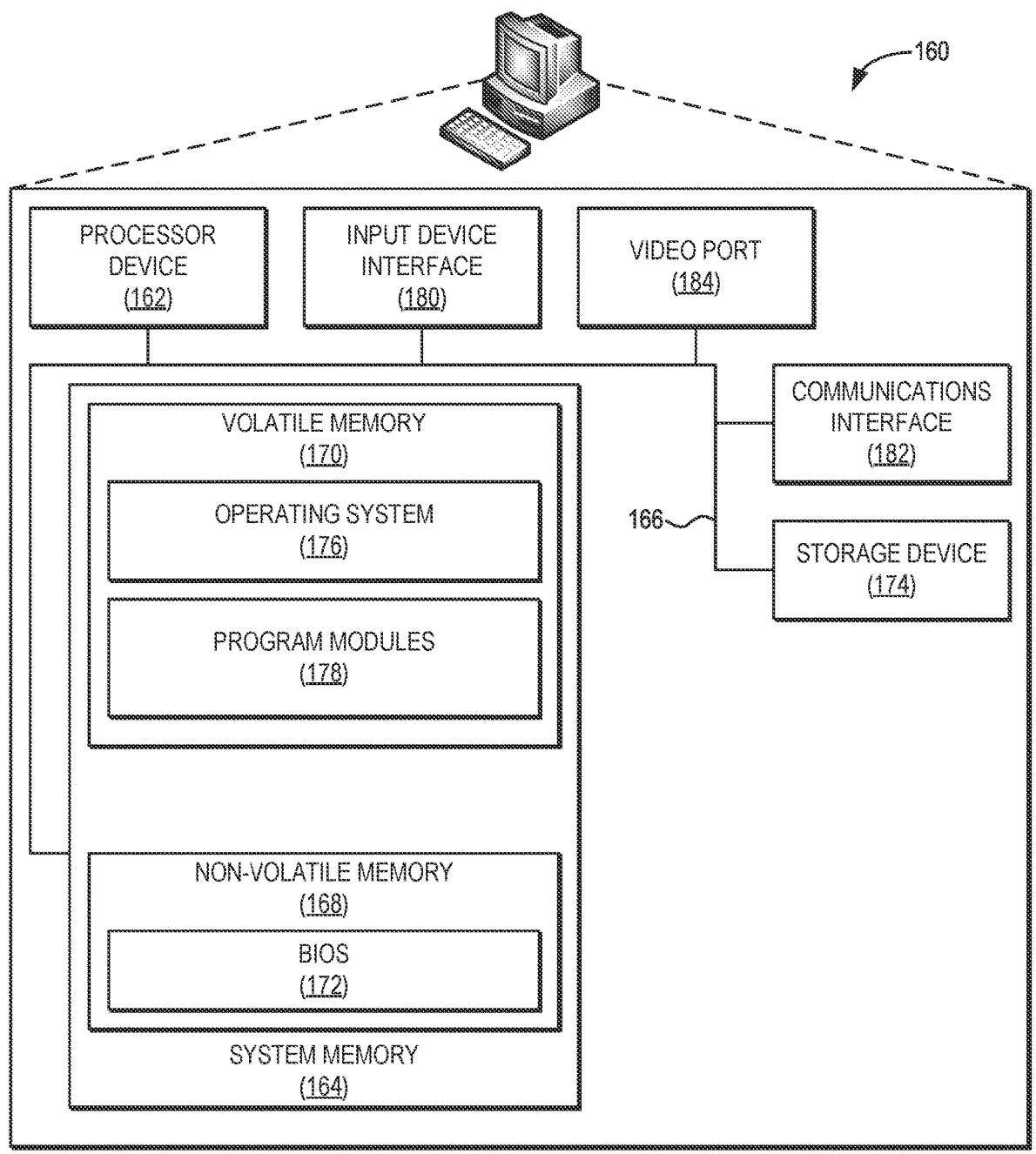
FIG. 7 is a block diagram of a classical computing device suitable for implementing examples, according to one example.

FIG. 7 is a block diagram of a processor-based computing device 160 ("computing device 160" or "classical computing device 160"), such as the classical computing device 18 of FIG. 1, suitable for implementing examples according to one example. The computing device 160 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 160 includes a processor device 162, a system memory 164, and a system bus 166. The system bus 166 provides an interface for system components including, but not limited to, the system memory 164 and the processor device 162. The processor device 162 can be any commercially available or proprietary processor.

The system bus 166 may be any of several types of bus structures that may further interconnect to a memory bus (with or without a memory controller), a peripheral bus, and/or a local bus using any of a variety of commercially available bus architectures. The system memory 164 may include non-volatile memory 168 (e.g., read-only memory (ROM), erasable programmable ROM (EPROM), electrically EPROM (EEPROM), etc.), and volatile memory 170 (e.g., RAM). A basic input/output system (BIOS) 172 may be stored in the non-volatile memory 168 and can include the basic routines that help to transfer information among elements within the computing device 160. The volatile memory 170 may also include a high-speed RAM, such as static RAM, for caching data.

The computing device 160 may further include or be coupled to a non-transitory computer-readable storage medium such as a storage device 174, which may comprise, for example, an internal or external hard disk drive (HDD) (e.g., enhanced integrated drive electronics (EIDE) or serial advanced technology attachment (SATA)), for storage, flash memory, or the like. The storage device 174 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 174 and in the volatile memory 170, including an operating system 176 and one or more program modules 178 which may implement the functionality described herein in whole or in part. It is to be appreciated that the examples can be implemented with various commercially available operating systems 176 or combinations of operating systems 176. All or a portion of the examples may be implemented as a computer program product stored on a transitory or non-transitory computer-usable or computer-readable storage medium, such as the storage device 174, which includes complex programming instructions, such as complex computer-readable program code, to cause the processor device 162 to carry out the steps described herein. Thus, the computer-readable program code can comprise software instructions for implementing the functionality of the examples described herein when executed on the processor device 162. The processor device 162 may serve as a controller, or control system, for the computing device 160 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 162 through an input device interface 180 that is coupled to the system bus 166 but can be connected by other interfaces, such as a parallel port, an Institute of Electrical and Electronic Engineers (IEEE) 1394 serial port, a Universal Serial Bus (USB) port, an IR interface, and the like.

The computing device 160 may also include a communications interface 182 suitable for communicating with a network as appropriate or desired. The computing device 160 may also include a video port 184 to interface with a display device to provide information to a user.

Figure 8:
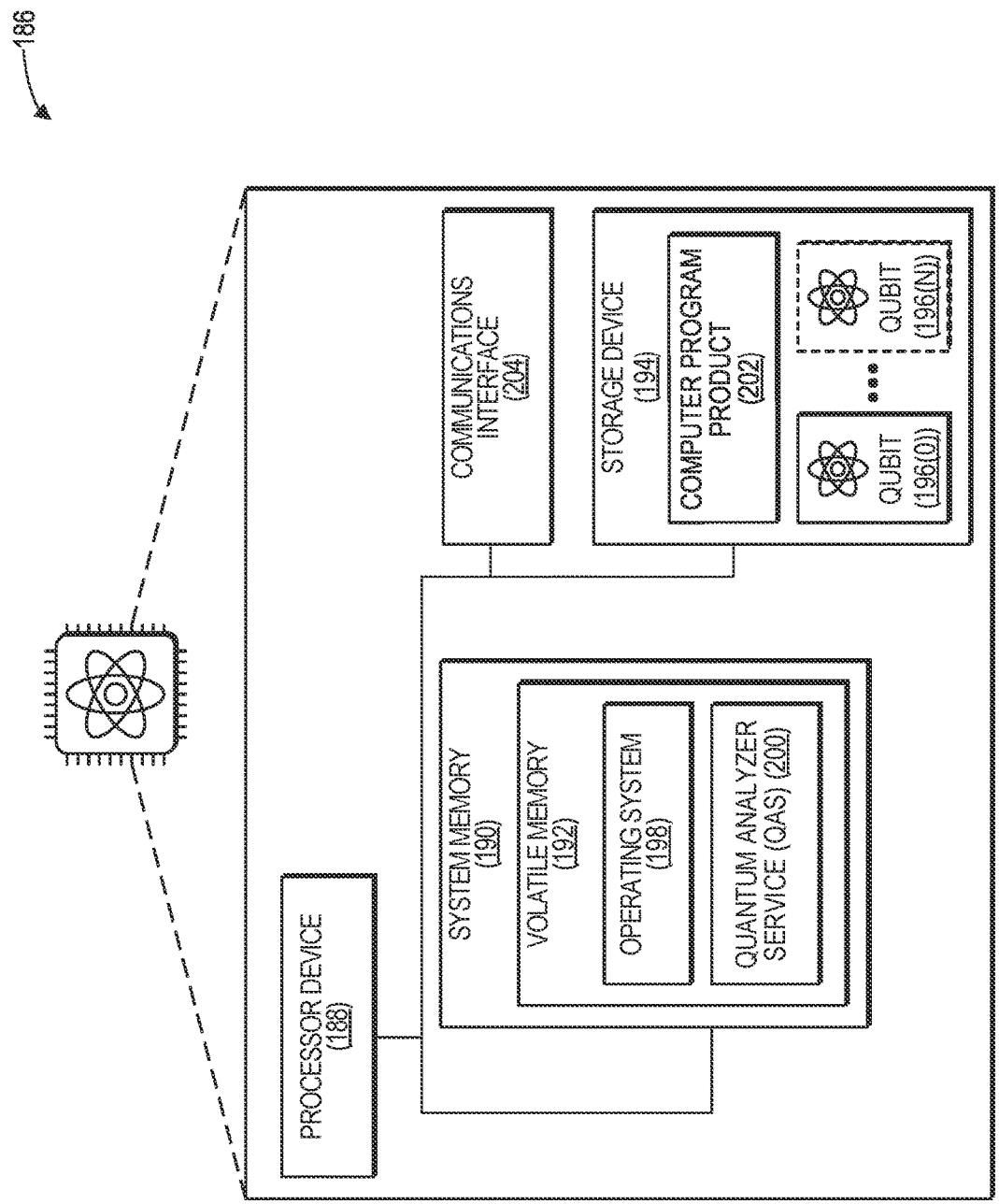
FIG. 8 is a block diagram of a quantum computing device suitable for implementing examples, according to one example.

FIG. 8 is a block diagram of a quantum computing device 186, such as the quantum computing device 12 of FIG. 1, suitable for implementing examples according to one example. The quantum computing device 186 may comprise any suitable quantum computing device or devices. The quantum computing device 186 can operate using classical computing principles or quantum computing principles. When using quantum computing principles, the quantum computing device 186 performs computations that utilize quantum-mechanical phenomena, such as superposition and entanglement. The quantum computing device 186 may operate under certain environmental conditions, such as at or near zero degrees (0°) Kelvin. When using classical computing principles, the quantum computing device 186 utilizes binary digits that have a value of either zero (0) or one (1).

The quantum computing device 186 includes a processor device 188 and a system memory 190. The processor device 188 can be any commercially available or proprietary processor suitable for operating in a quantum environment. The system memory 190 may include volatile memory 192 (e.g., random-access memory (RAM)). The quantum computing device 186 may further include or be coupled to a non-transitory computer-readable medium such as a storage device 194. The storage device 194 and other drives associated with computer-readable media and computer-usable media may provide non-volatile storage of data, data structures, computer-executable instructions, and the like. The storage device may also provide functionality for storing one or more qubits 196(0)-196(N).

A number of modules can be stored in the storage device 194 and in the volatile memory 192, including an operating system 198 and one or more modules, such as a QAS 200. All or a portion of the examples may be implemented as a computer program product 202 stored on a transitory or non-transitory computer-usable or computer-readable medium, such as the storage device 194, which includes complex programming instructions, such as complex computer-readable program code, to cause the processor device 188 to carry out the steps described herein. Thus, the computer-readable program code can comprise computer-executable instructions for implementing the functionality of the examples described herein when executed on the processor device 188.

An operator may also be able to enter one or more configuration commands through a keyboard (not illustrated), a pointing device such as a mouse (not illustrated), or a touch-sensitive surface such as a display device (not illustrated). The quantum computing device 186 may also include a communications interface 204 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
    executing, by a quantum computing device, a quantum service comprising one or more qubits;
    receiving, by the quantum computing device, a request to profile the quantum service;
    obtaining, by the quantum computing device, service metadata corresponding to the quantum service based on the request, wherein the service metadata comprises, at least in part, an input received by the quantum computing device and an output generated by the quantum computing device while executing the quantum service;
    generating a quantum service definition that defines one or more features of the quantum service based on the service metadata; and
    storing the quantum service definition on a persistent data store.

2. The method of claim 1, wherein the service metadata comprises one or more of a count of the one or more qubits, one or more qubit identifiers corresponding to the one or more qubits, and one or more locations corresponding to the one or more qubits.

3. The method of claim 1, wherein:
    obtaining the service metadata comprises conducting performance profiling of the quantum service; and
    the service metadata further comprises hardware resource usage data of the quantum service.

4. The method of claim 1, wherein the quantum service definition comprises a Quantum Assembly Language (QASM) file.

5. The method of claim 1, wherein:
    generating the quantum service definition comprises:
        transmitting, by the quantum computing device, the service metadata to a classical computing device communicatively coupled to the quantum computing device; and
        generating, by the classical computing device, the quantum service definition based on the service metadata; and
    storing the quantum service definition on a persistent data store comprises storing, by the classical computing device, the quantum service definition.

6. The method of claim 5, further comprising simulating, using a quantum simulator of the classical computing device, the quantum service based on the quantum service definition.

7. The method of claim 1, wherein:
    generating the quantum service definition comprises generating, by the quantum computing device, the quantum service definition based on the service metadata; and
    storing the quantum service definition on a persistent data store comprises storing, by the quantum computing device, the quantum service definition.

8. The method of claim 7, further comprising:
    transmitting, by the quantum computing device, the quantum service definition to a classical computing device communicatively coupled to the quantum computing device; and
    simulating the quantum service using a quantum simulator of the classical computing device, based on the quantum service definition.

9. A quantum computing device, comprising:
    a system memory; and
    a processor device communicatively coupled to the system memory, the processor device to:
        execute a quantum service comprising one or more qubits;
        receive a request to profile the quantum service;
        obtain service metadata corresponding to the quantum service based on the request, wherein the service metadata comprises, at least in part, an input received by the quantum computing device and an output generated by the quantum computing device while executing the quantum service;
        generate a quantum service definition that defines one or more features of the quantum service based on the service metadata; and
        store the quantum service definition on a persistent data store.

10. The quantum computing device of claim 9, wherein the service metadata comprises one or more of a count of the one or more qubits, one or more qubit identifiers corresponding to the one or more qubits, and one or more locations corresponding to the one or more qubits.

11. The quantum computing device of claim 9, wherein:
    to obtain the service metadata is to conduct performance profiling of the quantum service; and
    the service metadata further comprises hardware resource usage data of the quantum service.

12. The quantum computing device of claim 9, wherein the quantum service definition comprises a Quantum Assembly Language (QASM) file.

13. The quantum computing device of claim 9, wherein the processor device is further to transmit the quantum service definition to a classical computing device communicatively coupled to the quantum computing device.

14. The quantum computing device of claim 9, wherein the processor device is further to simulate the quantum service using a quantum simulator, based on the quantum service definition.

15. A computing system, comprising:
    a quantum computing device, comprising:
        a first system memory; and
        a first processor device communicatively coupled to the first system memory;
    a classical computing device, comprising:
        a second system memory; and a second processor device communicatively coupled to the second system memory;

the first processor device to:
  execute a quantum service comprising one or more qubits;
  receive a request to profile the quantum service;
  obtain service metadata corresponding to the quantum service based on the request, wherein the service metadata comprises, at least in part, an input received by the quantum computing device and an output generated by the quantum computing device while executing the quantum service; and
  transmit the service metadata to the classical computing device; and the second processor device to:
  receive the service metadata;
  generate a quantum service definition that defines one or more features of the quantum service based on the service metadata; and
  store the quantum service definition on a persistent data store.

16. The computing system of claim 15, wherein the service metadata comprises one or more of a count of the one or more qubits, one or more qubit identifiers corresponding to the one or more qubits, and one or more locations corresponding to the one or more qubits.

17. The computing system of claim 15, wherein:
  to obtain the service metadata is to conduct performance profiling of the quantum service; and
  the service metadata further comprises hardware resource usage data of the quantum service.

18. The computing system of claim 15, wherein the quantum service definition comprises a Quantum Assembly Language (QASM) file.

19. The computing system of claim 15, wherein the second processor device is further to simulate, using a quantum simulator of the classical computing device, the quantum service based on the quantum service definition.

20. The computing system of claim 19, wherein the quantum simulator comprises a Qiskit quantum computing framework.

* * * * *